Patented Nov. 20, 1945

2,389,489

UNITED STATES PATENT OFFICE 2,389,489

PLASTICIZED COMPOSITIONS

Russell T. Dean, Stamford, and Edwin O. Hook, Darien, Conn., assignors to American Cyanamid Company, New York, N. Y., a corporation of Maine No Drawing. Application October 15, 1942, Serial No. 462,144

6 Claims. (Cl. 260—36)

This invention relates to the softening or plasticizing of natural and synthetic rubber-like compositions suitable for various applications.

In the use of various available compounds for the production of synthetic rubber-like materials, it has been found necessary to employ various plasticizers and softening agents. Many of these plasticizers are costly materials and are difficult to incorporate by milling into the compositions. In addition, some of these plasticizers require a more or less extended aging period for the development of maximum plasticity. Furthermore, certain of the plasticizers which are used for assisting in the milling operations must be removed before the final curing of the rubber composition.

It is an object of the present invention to provide a new class of plasticizers for rubbery materials, which plasticizers are effective elasticators while, at the same time, they avoid the principal objections of the plasticizers previously available.

These and other objects are attained by using as plasticizers for the natural and synthetic rubbers alkylthiosuccinates having the following structural formula:

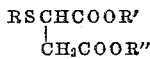

wherein R, R' and R" are the same or different alkyl, aralkyl or aryl groups. R' and R" may also be heterocyclic groups such as tetrahydrofurfuryl and the like. While the alkyl groups may be those of the lower boiling alcohols such as methyl and ethyl, such esters may be too volatile for some purposes. For the purpose of producing best plasticizers, it is generally preferable that the alkyl groups contain carbon to carbon chains not exceeding six carbon atoms in length.

The following specific examples are characteristic of methods of preparing the compounds of the present invention, parts being given by weight.

EXAMPLE 1

1.8 parts (.075 mol) of sodium was dissolved in a small amount of methanol and added to 156 parts (1.5 mols) of amyl mercaptan. Three hundred seventy-six parts (1.65 mols) of dibutyl maleate was slowly added, with stirring. The temperature was held below 40° C. by occasional cooling.

After standing for two days the reaction mixture was washed three times with water, dried over anhydrous sodium sulfate, and vacuum distilled. Four hundred and seventy-four parts of dibutyl amylthiosuccinate boiling at 144°–154° C. at 1 mm. was obtained. The yield was 95%.

Similarly, other compounds of this class may be prepared by reacting the desired mercaptan with suitable esters of maleic acid or fumaric acid as described above.

The plasticizers of the present invention are, as indicated, especially effective when used in the production of rubber-like compositions. Such rubber-like materials, which have been generically designated by Fisher (Ind. & Eng. Chem., vol. 31, page 942, August, 1939) as elastomers, include those prepared from vinyl chloride polymers, chloroprene polymers, polymerized diolefins and copolymers of diolefins and olefins, isobutene polymers, organic polysulfides and the various copolymer types of synthetic rubbers including polyacrylyl or polyvinyl compounds such as butadiene 1,3 and acrylonitrile copolymers or butadiene and styrene copolymers, and the like. The incorporation of the plasticizer with the rubber-like material may be carried out in accordance with the usual practice, during the milling or breaking-down period, e. g., on the mill rolls. The amount of the softening agent used may be varied widely and in general will be governed by the particular softening agent selected, the degree of toughness of the synthetic rubber-like mass, the extent to which softening of the latter is desired, and the other properties which it is desired to impart to the rubber-like composition. In general, the amount may be from about 5% or less to about 50% based on the weight of the synthetic rubber-like material.

As illustrative of suitable methods for incorporating the plasticizers of the present invention into the various compositions, the following examples are given without restricting the invention thereto.

EXAMPLE 2

One hundred parts by volume of polyvinyl chloride were mixed in a suitable container with 89 parts by volume of the selected plasticizer. This mixture was gradually fed onto a 6" x 12" open mill, the rolls of which were set tightly together and which were maintained at a temperature of about 150° C. The mixture, after having been passed once through the rolls, was in the form of a flaky product and was returned to the tightly-set rolls until a continuous sheet began to form. The period of time required to form this sheet was noted as the "sheeting time." The milling of the product was continued with gradual opening of the rolls to allow the mixture to build up a rolling bank of about ¼″ diameter. Without additional adjustment of the rolls, the milling was continued until a reasonably translucent sheet of plasticized polyvinyl chloride was obtained and the sheet was removed from the rolls.

The sheet removed from the roll was cooled and the cooled sheet molded in a suitable press for 20 minutes at 160° C. Samples were cut from the molded sheet and these samples were subjected to a series of tests as indicated in the following table, in which, for comparative purposes, dibutyl phthalate is set forth as a standard.

*Table 1*

|  | Sheeting time, minutes | Heat loss, percent | Solvent loss, percent | | Brittle point |
|---|---|---|---|---|---|
|  |  |  | App. | Real |  |
|  |  |  |  |  | °F. |
| Dibutyl phthalate | ½ | 31.7 | 16.8 | 23.1 | −50 |
| Dibutyl amylthiosuccinate | 3 | 29.6 | 16.3 | 19.6 | Below −50 |
| Ditetrahydrofurfuryl amylthiosuccinate | ½ | 44.3 | 10.9 | 16.0 | −4 |

The "real" solvent loss indicated in the table is the percent loss in weight of a sample which was soaked in 70° gasoline for 14 days and dried for 16 hours at 65° C. The "apparent" solvent loss represents the percentage change in weight of a sample after soaking for 48 hours in hexane and wiping the sample dry.

The heat loss in the table represents the percentage loss in weight of a sample after being heated for 14 days in an oven at 100° C.

The brittle point given in the table represents that temperature at which a sample broke when bent through a 90° angle.

Since dibutyl phthalate is considered a good plasticizer for polyvinyl chloride, those compounds which have plasticizing characteristics in about the same degree as dibutyl phthalate are valuable for this purpose. Where the plasticizers show lower solvent loss and/or lower heat loss than dibutyl phthalate, they are superior for many uses or applications. So far as the other physical properties such as elongation, tensile strength and the like are concerned, the plasticizers of the present invention give substantially the same or superior results in comparison with those obtained with dibutyl phthalate.

EXAMPLE 3

These plasticizers are also effective with other synthetic rubber-like materials, e. g., Hycar (butadiene 1, 3-acrylonitrile copolymers). In these tests, 250 parts by weight of Hycar were mixed with 125 parts by weight of the plasticizer by milling the mixture on suitable rolls at 50° C. The time required to incorporate the plasticizer was recorded as the "incorporation time." The plasticized Hycar was compounded in accordance with the following formula:

|  | Parts by weight |
|---|---|
| Hycar | ¹ 100 |
| Plasticizer | ¹ 50 |
| Channel black | 50 |
| Zinc oxide | 5 |
| Sulfur | 1.5 |
| Stearic acid | 1 |
| Phenyl-β-naphthylamine | 1 |
| Benzothiazyl disulfide | .95 |
| Zinc chloride-DOTG reaction product | .20 |

¹ Plasticized Hycar

After formulation, the batch was allowed to cool overnight and was then remilled and cooled for about four hours. This product was then cured in the form of sheets by heating for 30 minutes at a temperature of 153° C. The results obtained are contained in the following table.

*Table 2*

|  | Incorporation time, minutes | Percent heat loss | Apparent solvent loss | Brittle point | Impact resilience |
|---|---|---|---|---|---|
|  |  |  |  | °F. |  |
| Dibuytl phthalate | 16 | 25.3 | 3.4 | −50 | 47 |
| Dibutyl amylthiosuccinate | 22 | 25.3 | 1.4 | Below −50 | 50 |
| Ditetrahydrofurfuryl amylthiosuccinate | 17 | 17.3 | 1.7 | −35 | 35 |

The apparent solvent loss represents the percentage change in weight of a sample after soaking for 48 hours in hexane and wiping the sample dry.

The heat loss represents the percentage loss in weight after heating for 48 hours in an oven at 150° C.

The brittle point is the temperature at which the sample broke on being bent through an angle of 90°.

The impact resilience is the reading indicated by the Shore scleroscope, the higher the reading the more resilient the stock, thus indicating that the plasticizer is a good elasticator.

The plasticizers giving lower solvent loss, lower heat loss, lower brittle points and/or higher resilience than dibutyl phthalate are generally more desirable plasticizers, especially for such purposes as require superior properties in these respects. The other physical characteristics of the cured stock, such as plasticity ("Y" values), tensile strength, elongation, etc., are generally as good as, or superior to, the same properties obtained when dibutyl phthalate is used.

Mixtures of a natural rubber with one or more of the synthetic rubber-like materials of the kind referred to may also be obtained in a softened condition by the use of one or more of the plasticizers of the present invention. Furthermore, natural rubbers may, themselves, be plasticized by milling them with a relatively small amount of one of the present plasticizers, about 1–10% on the weight of the rubber being sufficient in most cases.

Where it is desired to obtain mixtures of two or more of the synthetic rubber-like materials described, either with each other or with a natural rubber, such mixtures are preferably prepared by first milling the tougher of the materials with one of the plasticizing agents so as to bring the same to a condition of softness approximating that of the softer component or components. Additional plasticizers may be added as milling is continued.

The quantity of plasticizers may be varied as well as the temperature and the length of time of mixing. In general, these interrelated factors will be governed by the efficiency of the plasticizer selected, as well as by the nature of the natural or synthetic rubber-like materials. The rate of incorporation of the plasticizers may be increased by raising the mixing temperature although it would obviously be undesirable to use such temperature as would have harmful effects on the ingredients of the mixture. Likewise, the size of the batches mixed will affect the mixing time.

The plasticized rubber-like compositions prepared in accordance with the present invention may be used wherever compositions of similar character are now employed. Thus, these compositions may be used in the waterproofing of fabrics as well as in the production of calendered, extruded or molded articles. The compositions may include various fillers, pigments, dyes, or the like.

Other suitable changes and modifications may be made in the invention without departing from the spirit and scope thereof, as defined in the appended claims.

We claim:

1. The process of plasticizing and softening a sulfur-vulcanizable, rubber-like copolymer of a conjugated diolefin and a compound copolymerizable therewith having a single olefinic linkage which comprises admixing therewith an alkylthiosuccinate having the structural formula

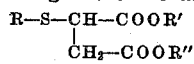

in which R is an alkyl radical containing 1 to 6 carbon atoms and R' and R" are the same radicals selected from the group consisting of the alkyl radicals of from 1 to 6 carbon atoms and the tetrahydrofurfuryl radical.

2. The process of plasticizing and softening a sulfur-vulcanizable, rubber-like copolymer of a conjugated diolefin and a compound copolymerizable therewith having a single olefinic linkage which comprises admixing therewith dibutyl amylthiosuccinate.

3. The process of plasticizing and softening a sulfur-vulcanizable, rubber-like copolymer of a conjugated diolefin and a compound copolymerizable therewith having a single olefinic linkage which comprises admixing therewith ditetrahydrofurfuryl amylthiosuccinate.

4. A composition comprising a sulfur-vulcanizable, rubber-like copolymer of a conjugated diolefin and a compound copolymerizable therewith having a single olefinic linkage plasticized with an effective amount of an alkylthiosuccinate having the structural formula

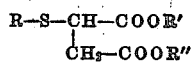

in which R is an alkyl radical containing 1 to 6 carbon atoms and R' and R" are the same radicals selected from the group consisting of the alkyl radicals of from 1 to 6 carbon atoms and the tetrahydrofurfuryl radical.

5. A composition comprising a sulfur-vulcanizable, rubber-like copolymer of a conjugated diolefin and a compound copolymerizable therewith having a single olefinic linkage plasticized with dibutyl amylthiosuccinate.

6. A composition comprising a sulfur-vulcanizable, rubber-like copolymer of a conjugated diolefin and a compound copolymerizable therewith having a single olefinic linkage plasticized with ditetrahydrofurfuryl amylthiosuccinate.

RUSSELL T. DEAN.
EDWIN O. HOOK.